(12) United States Patent
Park

(10) Patent No.: US 9,906,979 B2
(45) Date of Patent: Feb. 27, 2018

(54) APPARATUS, SYSTEM AND METHOD OF COMMUNICATING AN AUTHENTICATION REQUEST FRAME

(71) Applicant: INTEL CORPORATION, Santa Clara, CA (US)

(72) Inventor: Minyoung Park, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 24 days.

(21) Appl. No.: 14/894,362

(22) PCT Filed: Dec. 20, 2013

(86) PCT No.: PCT/US2013/076946
§ 371 (c)(1),
(2) Date: Nov. 26, 2015

(87) PCT Pub. No.: WO2014/204514
PCT Pub. Date: Dec. 24, 2014

(65) Prior Publication Data
US 2016/0119814 A1    Apr. 28, 2016

Related U.S. Application Data

(60) Provisional application No. 61/835,683, filed on Jun. 17, 2013.

(51) Int. Cl.
*H04W 28/02* (2009.01)
*H04L 1/00* (2006.01)
(Continued)

(52) U.S. Cl.
CPC ........ *H04W 28/0294* (2013.01); *H04L 1/00* (2013.01); *H04L 5/0055* (2013.01); *H04W 12/06* (2013.01);
(Continued)

(58) Field of Classification Search
None
See application file for complete search history.

(56) References Cited

U.S. PATENT DOCUMENTS

| 5,231,634 A | 7/1993 | Giles et al. |
| 7,881,340 B2 * | 2/2011 | Farrag ................... H04W 74/02 370/468 |

(Continued)

FOREIGN PATENT DOCUMENTS

| JP | 2011176888 A | 8/2011 |
| RU | 2350024 C1 | 3/2009 |

(Continued)

OTHER PUBLICATIONS

European Search Report for European Patent Application No. 13886153.9 dated Jan. 20, 2017, 8 pages.
(Continued)

*Primary Examiner* — Chi H Pham
*Assistant Examiner* — Shick Hom
(74) *Attorney, Agent, or Firm* — Shichrur & Co.

(57) ABSTRACT

Improved collision-avoidance techniques for a wireless communications system are described. In various embodiments, for example, an apparatus may comprise a processor circuit, a determination component for execution by the processor circuit to determine a current transmission interval comprising a series of beacon intervals, each of the series of beacon intervals comprising a plurality of time slots, randomly select one of the series of beacon intervals, and randomly select one of the plurality of time slots within the selected beacon interval, and a communications component for execution by the processor circuit to send a join request during the selected time slot. Other embodiments are described and claimed.

24 Claims, 7 Drawing Sheets

(51) Int. Cl.
*H04W 72/02* (2009.01)
*H04W 74/08* (2009.01)
*H04W 52/02* (2009.01)
*H04W 12/06* (2009.01)
*H04L 5/00* (2006.01)

(52) U.S. Cl.
CPC ... *H04W 52/0216* (2013.01); *H04W 52/0229* (2013.01); *H04W 72/02* (2013.01); *H04W 74/085* (2013.01); *Y02B 60/50* (2013.01)

(56) References Cited

U.S. PATENT DOCUMENTS

| | | | |
|---|---|---|---|
| 2004/0152464 | A1 | 8/2004 | Sugaya |
| 2006/0193274 | A1* | 8/2006 | Yamagata ............ H04W 74/085 370/310 |
| 2006/0285507 | A1 | 12/2006 | Kinder et al. |
| 2007/0025313 | A1* | 2/2007 | Bhagwat .................. H04K 3/65 370/338 |
| 2007/0208847 | A1 | 9/2007 | Knauerhase et al. |
| 2008/0144493 | A1 | 6/2008 | Yeh |
| 2009/0154437 | A1 | 6/2009 | Kim et al. |
| 2009/0238133 | A1 | 9/2009 | Sakoda |
| 2010/0329230 | A1 | 12/2010 | Yang et al. |
| 2011/0093593 | A1* | 4/2011 | Shirakata ................ H04L 63/08 709/225 |
| 2014/0073289 | A1* | 3/2014 | Velasco ................. H04W 12/04 455/411 |

FOREIGN PATENT DOCUMENTS

| | | |
|---|---|---|
| RU | 2474965 | 2/2013 |
| WO | 2007029977 | 3/2007 |
| WO | 2012148061 | 11/2012 |

OTHER PUBLICATIONS

International Search Report and Written Opinion for International Patent Application No. PCT/US2013/076946, dated Mar. 31, 2014, 9 pages.

International Preliminary Report on Patentability for International Patent Application No. PCT/US2013/076946, dated Dec. 30, 2015, 6 pages.

Minyoung Park et al., "Uplink Channel Access", doc. :IEEE 802. 11-12/060 6rl, May 14, 2012, 21 pages.

Office Action for Korean Patent Application No. 2014-7036191, dated Aug. 31, 2015, 4 pages (Including 1 page of English translation).

Office Action for Russian Patent Application No. 2014146208, dated Dec. 16, 2015, 8 pages (Including 2 pages of English translation).

IEEE Standard for Information technology,Telecommunications and information exchange between systems,Local and metropolitan area networks,Specific requirements Part 11: Wireless LAN Medium Access Control (MAC) and Physical Layer (PHY) Specifications IEEE Std 802.11™—2012 (Revision of IEEE Std 802.11. 2007) Mar. 29, 2012, 2793 pages.

Office Action for Russian Patent Application No. 2016118359/07, dated Jul. 12, 2017, 11 pages (Including 3 pages of English translation).

* cited by examiner

| Attempt No. | TI | Beacon Index | Slot Index | ACK Received? |
|---|---|---|---|---|
| 1 | 8 | 6 | 13 | NO |
| 2 | 16 | 14 | 4 | NO |
| 3 | 32 | 11 | 18 | NO |
| 4 | 64 | 55 | 15 | YES |

FIG. 6

_Storage Medium 600_

*Computer Executable Instructions for 400*

APPARATUS, SYSTEM AND METHOD OF COMMUNICATING AN AUTHENTICATION REQUEST FRAME

RELATED CASE

This application claims priority to U.S. Provisional Patent Application No. 61/835,683, filed Jun. 17, 2013, the entirety of which is hereby incorporated by reference.

TECHNICAL FIELD

Embodiments described herein generally relate to communications over wireless networks. More particularly, embodiments described herein generally relate to the transmission of requests to join wireless networks.

BACKGROUND

In a wireless communications system, wireless stations that wish to join a wireless network may transmit join requests to access points of the wireless network. In some cases, a large number of wireless stations may wish to join a wireless network via a particular access point at a particular point in time. If the wireless stations are unaware of each other and/or have difficulty sensing each other's transmissions, their respective join requests may frequently interfere with each other and may not be properly received by the access point. Collision-avoidance techniques may be utilized to mitigate such interference by reducing the frequency with which join requests from various wireless stations collide.

BRIEF DESCRIPTION OF THE DRAWINGS

FIG. 5 illustrates an embodiment of an event table.
FIG. 6 illustrates an embodiment of a storage medium.

DETAILED DESCRIPTION

Figure 1:
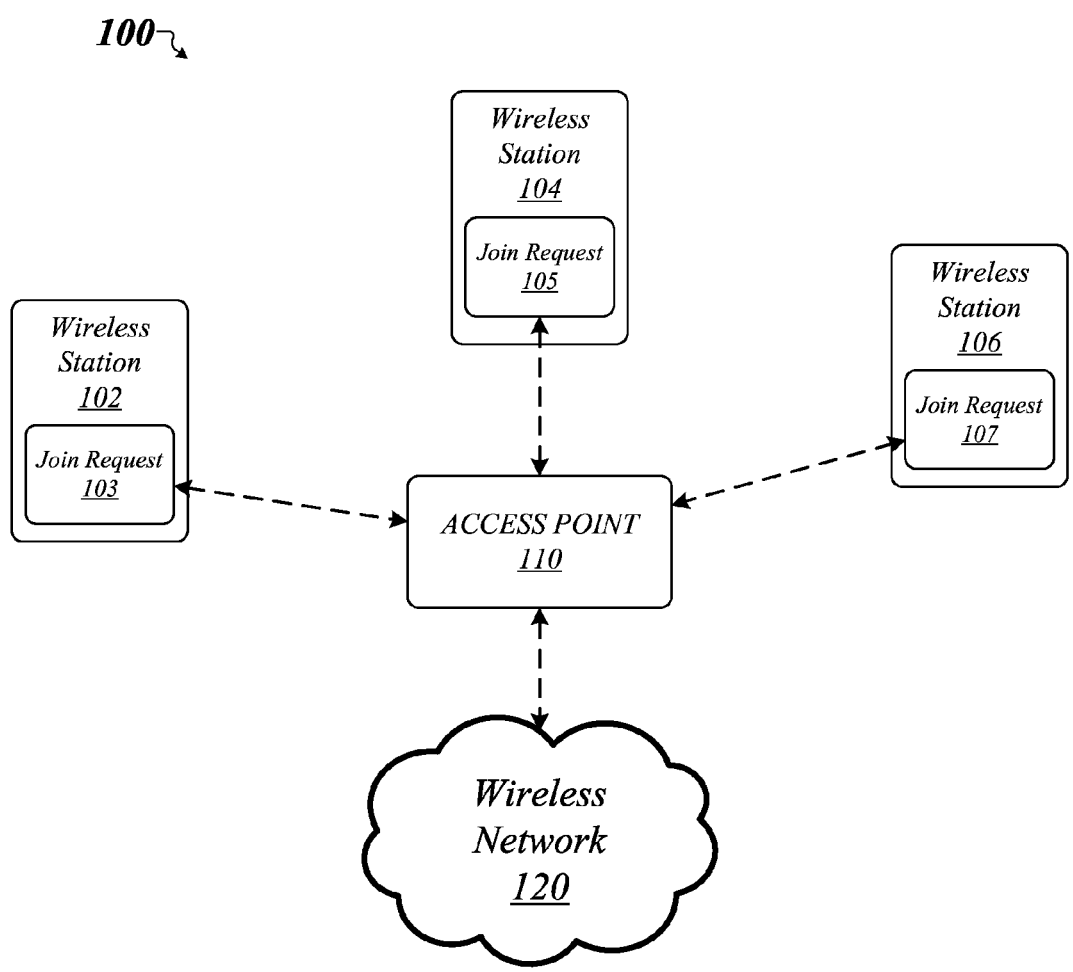
FIG. 1 illustrates an embodiment of an operating environment.

Collision-avoidance techniques may be utilized in a wireless communication system to reduce the frequency with which transmitted requests to join a wireless network collide with each other. For example, in a wireless network operating according to one or more Institute of Electrical and Electronics Engineers (IEEE) 802.11 Standards such as the IEEE 802.11-2012 Standard, published Mar. 29, 2012, titled "Part 11: Wireless LAN Medium Access Control (MAC) and Physical Layer (PHY) Specifications" ("an 802.11 network"), collision-avoidance techniques may be utilized to reduce the frequency of collisions between authentication/association request frames transmitted by wireless stations (STAs) attempting to join the network via a same access point (AP).

Conventional collision-avoidance techniques may require that an access point perform network measurements and/or communicate information and/or instructions to a large number of wireless stations that wish to join the network. For example, according to one conventional collision-avoidance technique for an 802.11 network, an AP may be required to estimate a congestion level for its portion of the network, provide this information to the various STAs that wish to use the AP to join the network, and instruct those STAs to randomly determine whether they will send a join request during a defined time period based on a probability defined based on the congestion level. Such operations may introduce undesirable communications and/or processing overhead.

Improved collision-avoidance techniques for a wireless communications system are described. In various embodiments, for example, an apparatus may comprise a processor circuit, a determination component for execution by the processor circuit to determine a current transmission interval comprising a series of beacon intervals, each of the series of beacon intervals comprising a plurality of time slots, randomly select one of the series of beacon intervals, and randomly select one of the plurality of time slots within the selected beacon interval, and a communications component for execution by the processor circuit to send a join request during the selected time slot. Other embodiments are described and claimed.

Various embodiments are generally directed to advanced wireless communications systems. Some embodiments are particularly directed to wireless networks implementing one or more IEEE 802.11 standards. Various such embodiments may be directed to one or more standards developed and/or adopted by the IEEE 802.11ah Task Group. However, the embodiments are not limited in this context. Other embodiments may also apply to wireless wide area networks (WWANs), wireless personal area networks (WPANs), and 3G or 4G wireless standards (including progenies and variants) related to wireless devices, user equipment or network equipment included in WWANs. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants.

Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited to these examples.

For ease of explanation, this description employs various terms that may often be associated with IEEE 802.11 networks, such as "wireless station" and "access point." It is to be understood that the use of these terms is not intended to limit the embodiments to 802.11 networks. The described techniques may be utilized in other types of networks in various embodiments, such as networks of the various other types mentioned above and/or networks of types other than those mentioned above. Hereinafter, the term "802.11 embodiment(s)" shall be employed to refer to embodiments comprising 802.11 networks. The embodiments are not limited in this context.

With general reference to notations and nomenclature used herein, the detailed descriptions that follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an embodiment of an operating environment 100 such as may comprise an example of an environment in which improved collision-avoidance techniques may be implemented in some embodiments. As shown in FIG. 1, wireless stations 102, 104, and 106 transmit respective join requests 103, 105, and 107 to access point 110 in order to attempt to join wireless network 120.

In various embodiments, wireless network 120 may comprise an 802.11 network, wireless stations 102, 104, and 106 may comprise STAs, join requests 103, 105, and 107 may comprise authentication and/or association request frames, and access point 110 may comprise an AP. It is to be understood that larger numbers of wireless stations may transmit join requests to a particular access point in some embodiments, and the embodiments are not limited in this context.

In the example operating environment 100 of FIG. 1, wireless stations 102, 104, and 106 may be unaware of each other, and may thus be unable to coordinate their transmissions. In other words, each of wireless stations 102, 104, and 106 may be required to transmit its respective join request without knowledge of whether and/or when other join requests are to be transmitted by the other wireless stations. If wireless stations 102, 104, and 106 transmit respective join requests 103, 105, and 107 at the same time, they may collide with each other, and access point 110 may be unable to properly receive and/or process them. In various embodiments, after wireless stations 102, 104, and 106 transmit their respective join requests, they may await an acknowledgement from access point 110 indicating that their join request was properly received. In the event of a collision, access point 110 may not transmit such acknowledgements for the colliding join requests, and the corresponding wireless stations may transmit additional join requests. If the additional join requests coincide with each other and/or with other join requests, further collisions may result.

Various embodiments are directed to techniques for reducing the frequency of such collisions by reducing the frequency with which wireless stations transmit simultaneous and/or overlapping join requests. More particularly, various embodiments are directed to techniques for reducing the frequency of such collisions without requiring that wireless stations transmitting join requests, such as wireless stations 102, 104, and 106 of FIG. 1, receive network congestion information from an access point, such as access point 110 of FIG. 1.

In some embodiments, wireless network 120 may operate according to a wireless communication protocol in which a basic time interval is defined for use as a reference by devices communicating over the network. In various embodiments, wireless stations 102, 104, and 106 and access point 110 may operate in a time-synchronized fashion, such that each device is aware of a time defined by a network clock and aware of start and end times for each basic time interval according to the network clock. For example, in some 802.11 embodiments, beacon intervals (BIs) may be defined for communication over wireless network 120, and wireless stations 102, 104, and 106 and access point 110 may be aware of the start and end times for each beacon interval. Hereinafter, for ease of explanation, such basic time intervals shall be referred to as "beacon intervals." It is to be understood, however, that the use of the term beacon interval is not intended to limit the embodiments to 802.11 networks. In various embodiments, each beacon interval may comprise a duration of 200 ms. The embodiments are not limited in this context.

In some embodiments, an algorithm may be utilized to distribute the transmission of join requests over time, based on defined beacon intervals for wireless network 120. In various embodiments, such an algorithm may be incorporated into a wireless communication standard and/or protocol. In some embodiments, according to such an algorithm, each beacon interval may be divided into multiple beacon interval slots. In various embodiments, for example, each beacon interval may be divided into twenty beacon interval slots. In some embodiments, for any particular join request, a wireless station may utilize such an algorithm to identify a beacon interval and a beacon interval slot within that beacon interval as a time during which the join request is to be transmitted. In various embodiments, a beacon index may identify a beacon interval during which the join request is to be transmitted, and a slot index may identify a particular slot during which the join request is to be transmitted within the beacon interval identified by the beacon index. In some embodiments, the beacon index may comprise a value identifying a beacon interval in terms of how many beacon intervals it falls after a current beacon interval. For example, a beacon index equal to 3 may identify the third beacon interval following a current beacon interval. The embodiments are not limited in this context.

Figure 2:
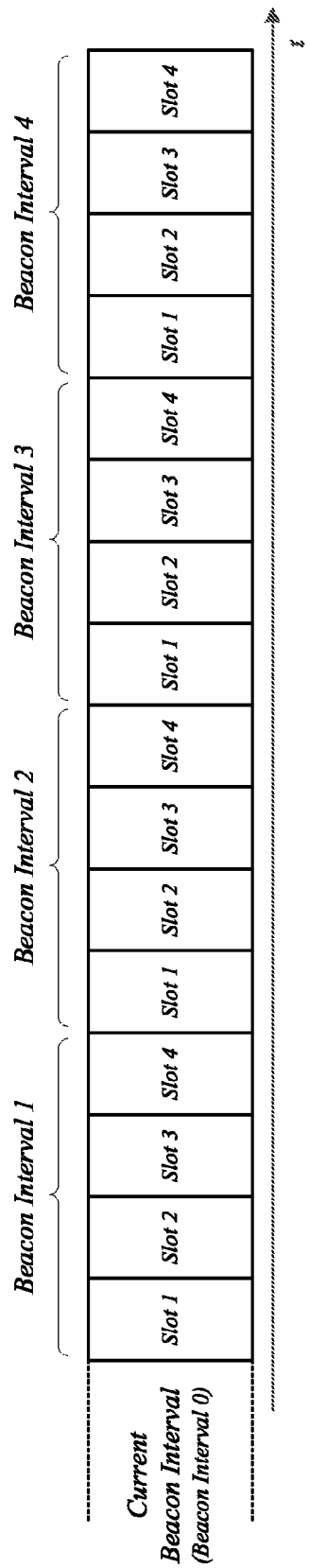
FIG. 2 illustrates an embodiment of a timing interval structure.

FIG. 2 illustrates an embodiment of a timing interval structure 200 such as may be utilized in various embodiments. As shown in FIG. 2, timing interval structure 200 comprises a series of beacon intervals, numbered sequentially with reference to a current beacon interval. More particularly, the current beacon interval is defined as beacon interval 0, the first beacon interval following the current beacon interval is defined as beacon interval 1, the second beacon interval following the current beacon interval is defined as beacon interval 2, and so forth. Additionally, each beacon interval in the example of FIG. 2 comprises four slots. With respect to the example of FIG. 2, a beacon index of 3 may identify beacon interval 3, and a slot index of 4 associated with the beacon index of 3 may identify slot 4 within beacon interval 3. The embodiment are not limited in this context.

In some embodiments, each time a wireless station elects to attempt to join a wireless network by transmitting a join request to an access point, the wireless station may determine a beacon index value based on a current value of a transmission interval (TI) for the wireless station. In various embodiments, the first time a wireless station attempts to join a particular wireless network, it may initialize its TI to a transmission interval minimum ($TI_{min}$). In some embodiments, $TI_{min}$ may comprise a value of 8 beacon intervals. In various embodiments, after each unsuccessfully transmitted join request, the wireless station may be operative to determine whether to increase its TI. In some embodiments, after each unsuccessfully transmitted join request, the wireless station may compare its current TI to a transmission interval maximum ($TI_{max}$), and to increase its TI if its current TI is less than $TI_{max}$. In various embodiments, $TI_{max}$ may comprise a value of 256 beacon intervals. In some embodiments, the wireless station may be operative to multiply its current TI by a value of 2 or by some other factor after each unsuccessfully transmitted join request, until its TI reaches $TI_{max}$. In some embodiments, any particular join request may be considered unsuccessfully transmitted if an acknowledgment is not received in response to that join request. The embodiments are not limited in this context.

In various embodiments, each time a wireless station determines to attempt to join a wireless network by transmitting a join request to an access point, it may randomly determine a beacon index value as a random integer within the set of integers [1, . . . , TI], and may randomly determine a slot index value as a random integer within the set of integers [1, . . . , L], where L comprises the number of slots within each beacon interval. In some embodiments, the beacon index value may identify a particular beacon among those comprising the TI, and the slot index value may identify a slot within that particular beacon. The wireless station may then be operative to transmit a join request during a slot identified by the slot index value within a beacon interval identified by the beacon index value. In various embodiments, a current beacon interval may be defined as beacon interval 0, and subsequent beacon intervals may be sequentially numbered in increasing integer order. In such embodiments, the beacon index value may comprise a number of a subsequent beacon interval. For example, a beacon index value of 7 may identify a seventh beacon interval following a current beacon interval as the beacon interval during which a join request is to be transmitted. The embodiments are not limited to this example.

One advantage of some embodiments may be that an access point is not required to monitor and/or estimate network congestion levels, and thus processing load on the access point may be reduced. Another advantage of various embodiments may be that access points are not required to transmit network congestion information to wireless stations, and thus communications overhead may be reduced. A third advantage of some embodiments may be that in systems in which periodic beacons would otherwise be utilized to transmit network congestion information to wireless stations, the wireless stations may not need to receive all or any of the periodic beacons while they are waiting to transmit join requests. This may allow such wireless stations to enter sleep modes or other reduced power states until their scheduled transmission times, resulting in reduced power consumption. Yet another advantage of various embodiments may be that automatic adjustments are made to alleviate the effects of sudden increases in network load. Other advantages may be associated with some embodiments, and the embodiments are not limited in this context.

Figure 3:
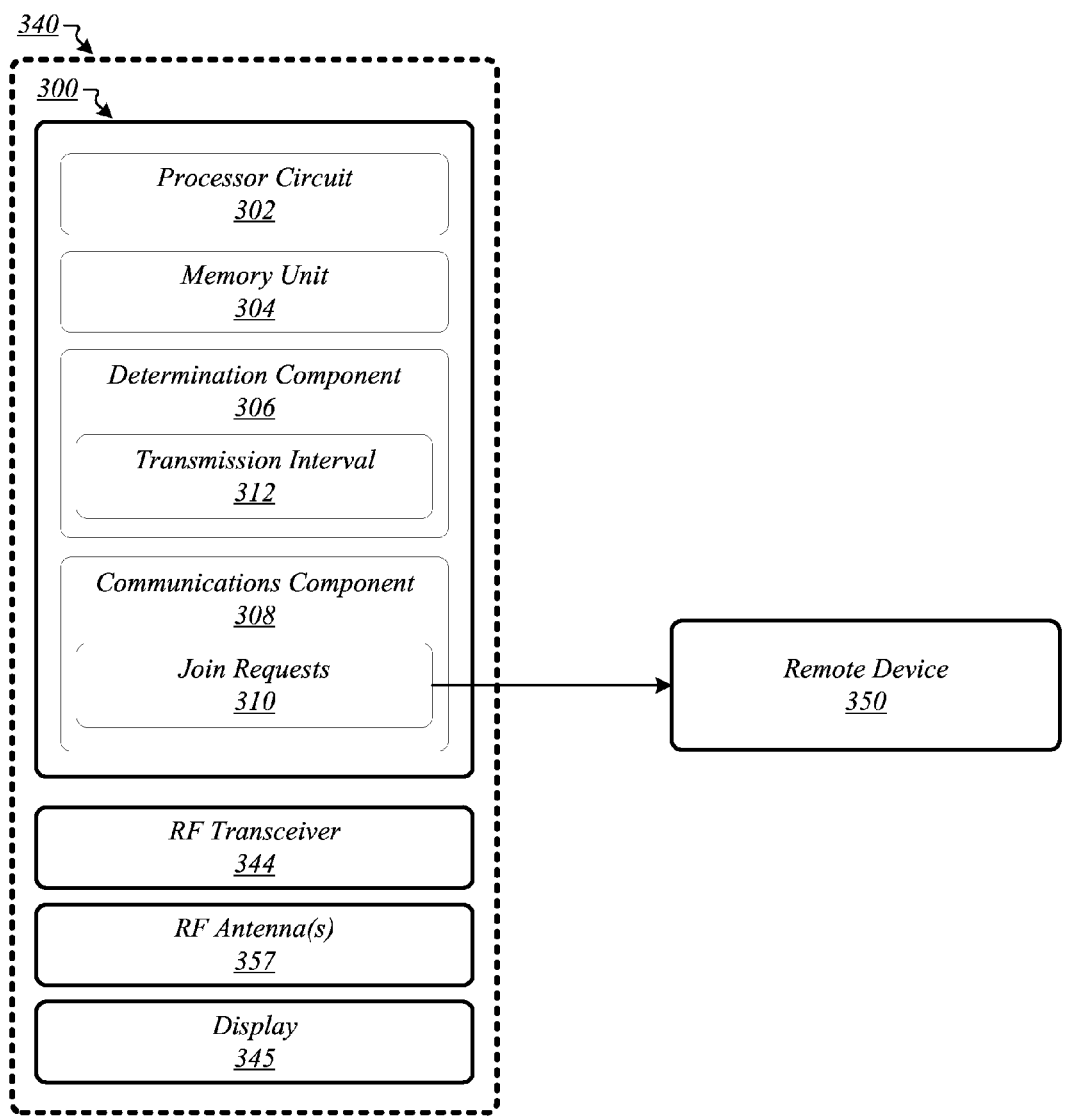
FIG. 3 illustrates an embodiment of an apparatus and an embodiment of a system.

FIG. 3 illustrates a block diagram of an apparatus 300. Apparatus 300 comprises an example of an apparatus, such as wireless station 102, 104, and/or 106 of FIG. 1, which may send one or more join requests in conjunction with a timing interval structure such as timing interval structure 200 of FIG. 2. As shown in FIG. 3, apparatus 300 comprises multiple elements including a processor circuit 302, a memory unit 304, a determination component 306, and a communications component 308. The embodiments, however, are not limited to the type, number, or arrangement of elements shown in this figure.

In various embodiments, apparatus 300 may comprise processor circuit 302. Processor circuit 302 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 302 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 302 may be implemented as a general purpose processor, such as a processor made by Intel® Corporation, Santa Clara, Calif. The embodiments are not limited in this context.

In some embodiments, apparatus 300 may comprise or be arranged to communicatively couple with a memory unit 304. Memory unit 304 may be implemented using any machine-readable or computer-readable media capable of storing data, including both volatile and non-volatile memory. For example, memory unit 304 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 304 may be included on the same integrated circuit as processor circuit 302, or alternatively some portion or all of memory unit 304 may be disposed on an integrated circuit or other medium, for example a hard disk drive, that is external to the integrated circuit of processor circuit 302. Although memory unit 304 is comprised within apparatus 300 in FIG. 3, memory unit 304 may be external to apparatus 300 in some embodiments. The embodiments are not limited in this context.

In various embodiments, apparatus 300 may comprise a determination component 306. Determination component 306 may comprise logic, circuitry, and/or instructions operative to manage the timing of one or more join requests 310 that apparatus 300 and/or system 340 may send in order to attempt to join a wireless network. In some embodiments, determination component 306 may be operative to manage the timing of such join requests 310 in conjunction with a timing interval structure such as timing interval structure 200 of FIG. 2. The embodiments are not limited in this context.

In various embodiments, apparatus 300 may comprise a communications component 308. Communications component 308 may comprise logic, circuitry, and/or instructions operative to send messages to one or more remote devices and/or to receive messages from one or more remote devices. In some embodiments, communications component 308 may be operative to send one or more join requests 310 in order to enable apparatus 300 and/or system 340 to join a wireless network. In some embodiments, for example, communications component 308 may be operative to send one or more join requests 310 to a remote device 350. In various embodiments, remote device 350 may comprise a wireless access point, and communications component 308 may be operative to send one or more join requests 310 to remote device 350 in order to enable apparatus 300 and/or system 340 to authenticate and/or associate with the access point. The embodiments are not limited to this example.

FIG. 3 also illustrates a block diagram of a system 340. System 340 may comprise any of the aforementioned elements of apparatus 300. System 340 may further comprise one or more additional components. For example, in various embodiments, system 340 may comprise a radio frequency (RF) transceiver 344. RF transceiver 344 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, RF transceiver 344 may operate in accordance with one or more applicable standards in any version. The embodiments are not limited in this context.

In some embodiments, system 340 may comprise one or more RF antennas 357. Examples of any particular RF antenna 357 may include an internal antenna, an omni-directional antenna, a monopole antenna, a dipole antenna, an end-fed antenna, a circularly polarized antenna, a microstrip antenna, a diversity antenna, a dual antenna, a tri-band antenna, a quad-band antenna, and so forth. The embodiments are not limited to these examples. In some embodiments, communications component 308 may be operative to exchange communications with one or more remote devices using RF transceiver 344 and/or one or more RF antennas 357. For example, in various embodiments, communications component 308 may be operative on RF transceiver 344 and one or more RF antennas 357 to transmit one or more join requests 310 to remote device 350. The embodiments are not limited in this context.

In various embodiments, system 340 may include a display 345. Display 345 may comprise any display device capable of displaying information received from processor circuit 302. Examples for display 345 may include a television, a monitor, a projector, and a computer screen. In one embodiment, for example, display 345 may be implemented by a liquid crystal display (LCD), light emitting diode (LED) or other type of suitable visual interface. Display 345 may comprise, for example, a touch-sensitive display screen ("touchscreen"). In various implementations, display 345 may comprise one or more thin-film transistors (TFT) LCD including embedded transistors. The embodiments are not limited in this context.

In various embodiments, during operation of apparatus 300 and/or system 340, determination component 306 may be operative to determine that a wireless network connection and/or association is desired. For example, determination component 306 may determine that a wireless network connection and/or association is desired when a previous wireless network connection is lost. In another example, determination component 306 may determine that a wireless network connection and/or association is desired when apparatus 300 and/or system 340 is in an unconnected state following power-on. In some embodiments, determination component 306 and/or one or more other components of apparatus 300 and/or system 340 may be operative to identify remote device 350, which may comprise a wireless network node via which apparatus 300 and/or system 340 may connect to a wireless network. For example, remote device 350 may comprise a nearby wireless access point (AP). In various embodiments, determination component 306 may be operative to determine that it should attempt to authenticate and/or associate with remote device 350 in order to establish a connection to a wireless network associated with remote device 350. The embodiments are not limited in this context.

In some embodiments, determination component 306 may be operative to determine that it should attempt to authenticate and/or associate with remote device 350, and apparatus 300 and/or system 340 may then be operative to commence an iterative authentication/association process. In various embodiments, each iteration thereof may generally involve applying a timing algorithm to determine a timing for transmission of a join request 310, transmitting the join request 310 according to the determined timing, and then determining if the transmission has been successful. In some embodiments, the timing for each join request 310 may be determined in conjunction with a timing interval structure such as timing interval structure 200 of FIG. 2. In various embodiments, the determination of whether each transmission has been successful may be based on whether an acknowledgment of that transmission is received. The embodiments are not limited in this context.

In some embodiments, during each iteration of the iterative authentication/association process, determination component 306 may be operative to determine a current transmission interval 312, randomly select a beacon interval within the current transmission interval 312, and randomly select a time slot within that beacon interval. In various embodiments, during each iteration of the iterative authentication/association process, communications component 308 may be operative to send a join request 310 during the time slot selected by determination component 306. In some embodiments, during each iteration, determination component 306 may then be operative to determine whether transmission of the join request 310 has been successful. In various embodiments, the iterative authentication/association process may end following the first iteration in which detection component 306 determines that a join request 310 has been successfully transmitted. For example, in some embodiments, the iterative authentication/association process may end following the first iteration during which an acknowledgment is received in response to a join request 310. The embodiments are not limited in this context.

In various embodiments, during a first iteration of the iterative authentication/association process, determination component 306 may be operative to set the current transmission interval 312 equal to a defined initial transmission interval. In some embodiments, the initial transmission interval may comprise a minimum transmission interval. In various embodiments, the initial transmission interval may comprise eight beacon intervals. In some embodiments, for each subsequent iteration of the iterative authentication/association process, determination component 306 may be operative to determine a transmission interval 312 for use during that iteration based on the transmission interval 312 utilized during the previous iteration. In various embodiments, for example, for each subsequent iteration, determination component 306 may be operative to determine whether the transmission interval 312 utilized during the previous iteration is less than a maximum transmission interval, and may be operative to determine the subsequent transmission interval 312 by increasing the previously-used transmission interval 312 when the previously-used transmission interval 312 is less than the maximum transmission interval. In some embodiments, determination component 306 may be operative to determine that the subsequent transmission interval 312 is to be equal to the previously-used transmission interval 312 when the previously-used transmission interval 312 is not less than the maximum transmission interval. The embodiments are not limited in this context.

Figure 4:
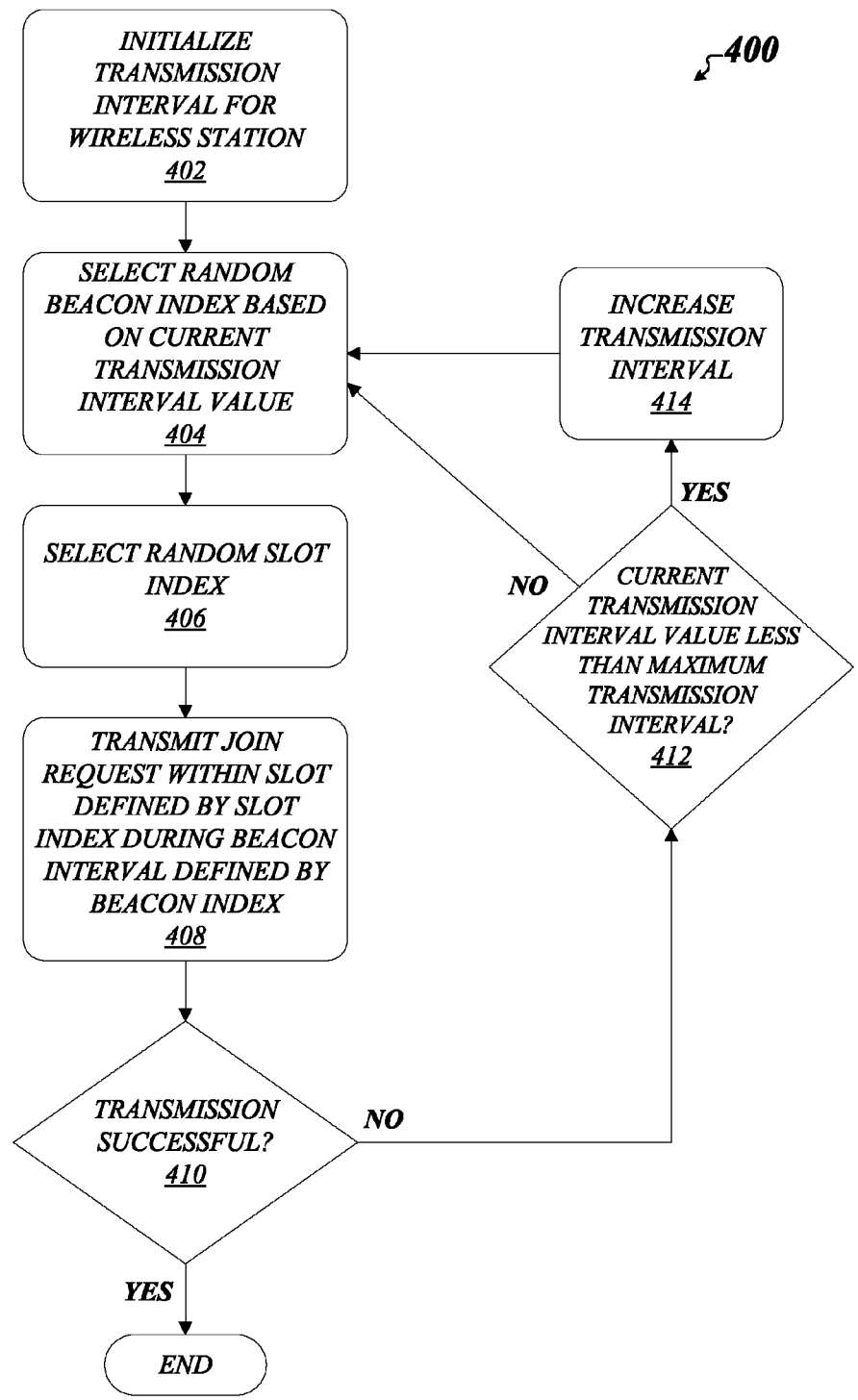
FIG. 4 illustrates an embodiment of a logic flow.

FIG. 4 illustrates one embodiment of a logic flow 400, which may be representative of the operations executed by one or more embodiments described herein. More particularly, logic flow 400 may comprise an example of operations performed by apparatus 300 and/or system 340 of FIG. 3, which in some embodiments may comprise a wireless station, such as wireless station 102, 104, and/or 106 of FIG. 1. As shown in FIG. 4, at 402, a transmission interval (TI) for a wireless station may be initialized. For example, wireless station 102 of FIG. 1 may initialize its TI to a value of $TI_{min}$. At 404, a random beacon index may be selected based on a current value of the TI for the wireless station.

For example, wireless station 102 of FIG. 1 may select a random integer from among the set [1, . . . , TI] as a beacon index. At 406, a random slot index may be selected. For example, wireless station 102 of FIG. 1 may select a random integer from among the set [1, . . . , L] as a slot index, where L indicates the number of slots in each beacon interval. At 408, a join request may be transmitted within a slot defined by the slot index during a beacon interval defined by the beacon index. For example, if it has selected a slot index of 7 and a beacon index of 5, wireless station 102 of FIG. 1 may transmit a join request to access point 110 during a seventh slot in a fifth beacon interval following a current beacon interval. At 410, it may be determined whether the transmission of the join request was successful. In various embodiments, this determination may be made based on whether an acknowledgment of the join request has been received from an access point. For example, wireless station 102 of FIG. 1 may determine that the transmission of the join request has been successful if it receives an ACK message from access point 110 in response to the transmission.

If it is determined at 410 that the transmission of the join request has been successful, the logic flow may end. On the other hand, if it is determined that the transmission of the join request has been unsuccessful, flow may pass to 412. At 412, it may be determined whether the current value of the TI is less than a maximum transmission interval ($TI_{max}$). For example, wireless station 102 of FIG. 1 may determine whether its current TI is less than a $TI_{max}$ comprising 256 beacon intervals. If it is determined at 412 that the current TI is less than $TI_{max}$, flow may pass to 414. At 414, the TI may be increased. For example, wireless station 102 of FIG. 1 may multiply its TI by a factor of two. From 414, flow may return to 404, at which point operations may commence for the eventual transmission of another join request. Flow may return directly to 404 from 412 if it is determined at 412 that the current TI value is not less than $TI_{max}$. The embodiments are not limited to the above-recited examples.

FIG. 5 illustrates an event table 500 comprising information describing a series of join requests performed by a wireless station in an example embodiment. In the example embodiment described in event table 500, $TI_{min}$ comprises a value of 8 beacon intervals, and each beacon interval comprises 20 slots. As such, for its first attempt, the wireless station initializes its TI to a value of 8 beacon intervals, selects a random integer from 1 to 8 as its beacon index, and selects a random integer from 1 to 20 as its slot index. As shown in event table 500, the wireless station selects a beacon index of 6 and a slot index of 13 for the first attempt, but does not receive an acknowledgment of its subsequent join request. For its second attempt, the wireless station doubles its TI to 16, selects a random integer from 1 to 16 as its beacon index, and selects a random integer from 1 to 20 as its slot index. As shown in event table 500, the wireless station selects a beacon index of 14 and a slot index of 4 for the second attempt, but again does not receive an acknowledgment of its subsequent join request. The wireless station doubles its TI to 32, selects a beacon index of 11, and selects a slot index of 18 for its third attempt, but yet again does not receive an acknowledgment of its subsequent join request. Finally, for its fourth attempt, the wireless station once more doubles its TI to 64, selects a beacon index of 55, and selects a slot index of 15, and receives an acknowledgment of its subsequent join request. The embodiments are not limited to these examples.

FIG. 6 illustrates an embodiment of a storage medium 600. The storage medium 600 may comprise an article of manufacture. In one embodiment, the storage medium 600 may comprise any non-transitory computer readable medium or machine readable medium, such as an optical, magnetic or semiconductor storage. The storage medium may store various types of computer executable instructions, such as computer executable instructions to implement logic flow 400 of FIG. 4. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 7:
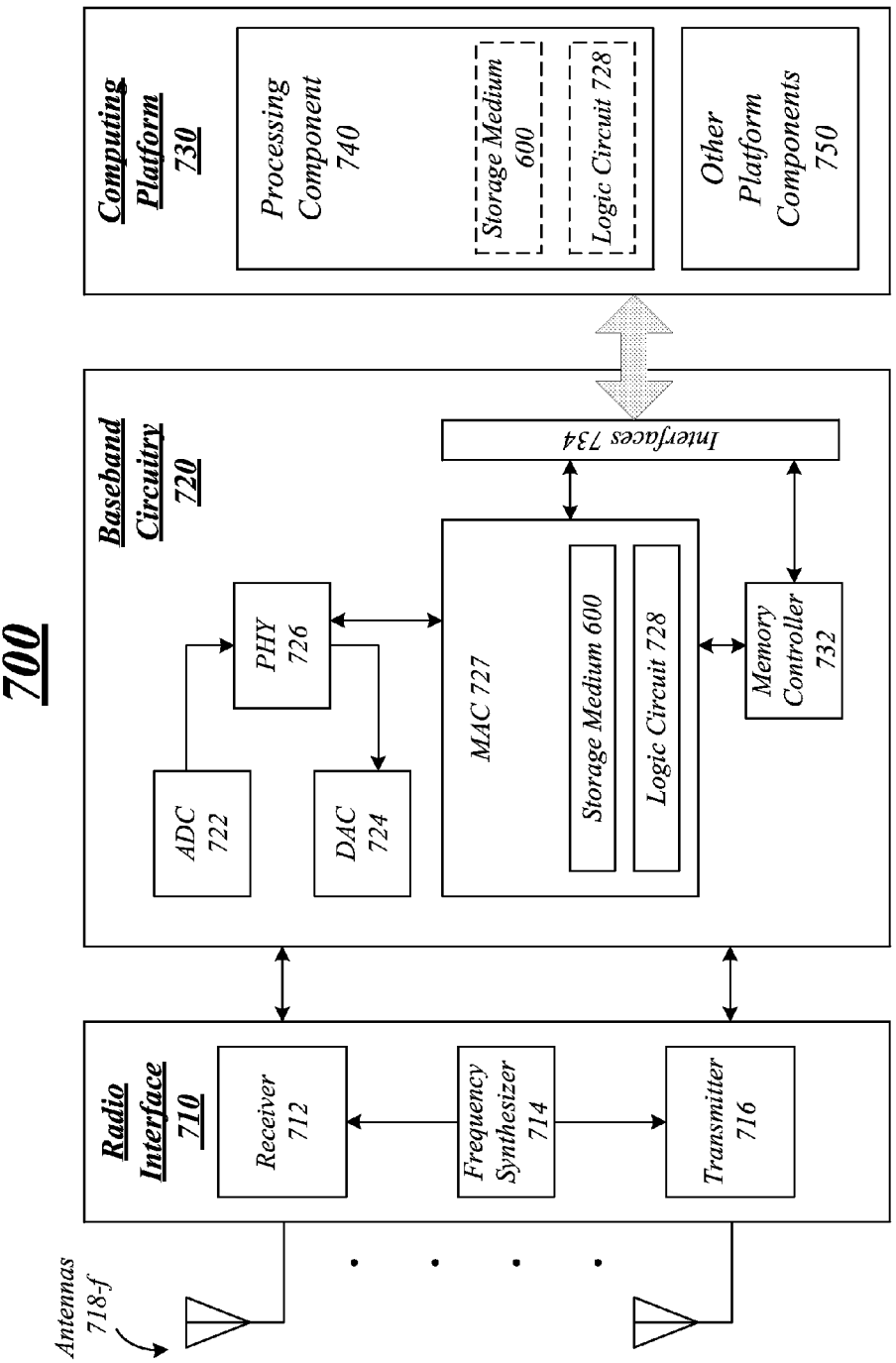
FIG. 7 illustrates an embodiment of a device.

FIG. 7 illustrates an embodiment of a device 700 for use in a wireless communications system, such as an IEEE 802.11 WLAN system. Device 700 may be suitable to implement various embodiments in an operating environment such as operating environment 100 of FIG. 1, such as apparatus 300 and/or system 340 of FIG. 3 and/or logic flow 400 of FIG. 4. Device 700 may be implemented, for example, in a STA, AP, user equipment (UE), a base station, the storage medium 600 and/or a logic circuit 730. The logic circuit 730 may include physical circuits to perform operations described for a STA, AP, UE, or base station. As shown in FIG. 7, device 700 may include a radio interface 710, baseband circuitry 720, and computing platform 730, although embodiments are not limited to this configuration.

The device 700 may implement some or all of the structure and/or operations for a STA, AP, UE, base station, the storage medium 600 and/or logic circuit 730 in a single computing entity, such as entirely within a single device. Alternatively, the device 700 may distribute portions of the structure and/or operations for a STA, UE, AP, base station, the storage medium 600 and/or logic circuit 730 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 710 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 710 may include, for example, a receiver 712, a transmitter 716 and/or a frequency synthesizer 714. Radio interface 710 may include bias controls, a crystal oscillator and/or one or more antennas 718-$p$. In another embodiment, radio interface 710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 720 may communicate with radio interface 710 to process receive and/or transmit signals and may include, for example, an analog-to-digital converter 722 for down converting received signals, a digital-to-analog converter 724 for up converting signals for transmission. Further, baseband circuitry 720 may include a baseband or physical layer (PHY) processing circuit 756 for PHY link layer processing of respective receive/transmit signals. Baseband circuitry 720 may include, for example, a processing circuit 728 for medium access control (MAC)/data link layer processing. Baseband circuitry 720 may include a memory controller 732 for communicating with processing circuit 728 and/or a computing platform 730, for example, via one or more interfaces 734.

In some embodiments, PHY processing circuit 726 may include a frame construction and/or detection module, in combination with additional circuitry such as a buffer memory, to construct and/or deconstruct communication frames. Alternatively or in addition, MAC processing circuit 728 may share processing for certain of these functions or perform these processes independent of PHY processing circuit 726. In some embodiments, MAC and PHY processing may be integrated into a single circuit.

The computing platform 730 may provide computing functionality for the device 700. As shown, the computing platform 730 may include a processing component 740. In addition to, or alternatively of, the baseband circuitry 720, the device 700 may execute processing operations or logic for a STA, AP, UE, base station, the storage medium 600 and/or logic circuit 730 using the processing component 730. The processing component 730 (and/or PHY 726 and/or MAC 728) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 730 may further include other platform components 750. Other platform components 750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EE- PROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 700 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 700 described herein, may be included or omitted in various embodiments of device 700, as suitably desired. In some embodiments, device 700 may be configured to be compatible with protocols and frequencies associated one or more of the 3GPP LTE Specifications and/or IEEE 702.16 Standards for WMANs, and/or other broadband wireless networks, cited herein, although the embodiments are not limited in this respect.

Embodiments of device 700 may be implemented using single input single output (SISO) architectures. However, certain implementations may include multiple antennas (e.g., antennas 718-*p*) for transmission and/or reception using adaptive antenna techniques for beamforming or spatial division multiple access (SDMA) and/or using MIMO communication techniques.

The components and features of device 700 may be implemented using any combination of discrete circuitry, application specific integrated circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

The following examples pertain to further embodiments:

Example 1 is at least one machine-readable medium comprising a plurality of wireless communication instructions that, in response to being executed on a computing device, cause the computing device to determine a current transmission interval comprising a series of beacon intervals, each of the series of beacon intervals comprising a plurality of time slots, randomly select one of the series of beacon intervals, randomly select one of the plurality of time slots within the selected beacon interval, and send a join request during the selected time slot.

In Example 2, the at least one machine-readable medium of Example 1 may optionally comprise wireless communication instructions that, in response to being executed on the computing device, cause the computing device to determine whether the join request has been successful, and when it determines that the join request has not been successful, determine a subsequent transmission interval based on the current transmission interval, randomly select a time slot within a beacon interval of the subsequent transmission interval, and send a subsequent join request during the randomly selected time slot within the beacon interval of the subsequent transmission interval.

In Example 3, the at least one machine-readable medium of Example 2 may optionally comprise wireless communication instructions that, in response to being executed on the computing device, cause the computing device to, when it determines that the join request has not been successful, determine whether the current transmission interval is less than a maximum transmission interval, when the current transmission interval is less than the maximum transmission interval, determine the subsequent transmission interval by increasing the current transmission interval, and when the current transmission interval is not less than the maximum transmission interval, determine that the subsequent transmission interval is to be equal to the current transmission interval.

In Example 4, the at least one machine-readable medium of Example 3 may optionally comprise wireless communication instructions that, in response to being executed on the computing device, cause the computing device to, when the current transmission interval is less than the maximum transmission interval, determine the subsequent transmission interval by multiplying the current transmission interval by two.

In Example 5, the maximum transmission interval of Example 4 may optionally comprise 256 beacon intervals.

In Example 6, the at least one machine-readable medium of any one of Examples 1 to 5 may optionally comprise wireless communication instructions that, in response to being executed on the computing device, cause the computing device to determine that the current transmission interval comprises an initial transmission interval when the join request comprises an initial join request.

In Example 7, the initial transmission interval of Example 6 may optionally comprise 8 beacon intervals.

In Example 8, the at least one machine-readable medium of any one of Examples 1 to 7 may optionally comprise wireless communication instructions that, in response to being executed on the computing device, cause the computing device to determine the current transmission interval based on a previous transmission interval when it determines that a previous join request has not been successfully transmitted.

In Example 9, the join request of any one of Examples 1 to 8 may optionally comprise an authentication request frame.

In Example 10, the at least one machine-readable medium of any one of Examples 1 to 9 may optionally comprise wireless communication instructions that, in response to being executed on the computing device, cause the computing device to determine whether the join request has been successfully transmitted based on whether an acknowledgment frame has been received in response to the join request.

In Example 11, the randomly selecting the one of the series of beacon intervals of any one of Examples 1 to 10 may optionally comprise randomly selecting a beacon index based on the current transmission interval, and the beacon index may optionally identify the one of the series of beacon intervals.

In Example 12, the randomly selecting the one of the plurality of time slots of any one of Examples 1 to 11 may optionally comprise randomly selecting a slot index identifying the one of the plurality of time slots.

In Example 13, each of the series of beacon intervals of any one of Examples 1 to 12 may optionally comprise a duration of 200 ms.

In Example 14, the plurality of time slots of any one of Examples 1 to 13 may optionally comprise 20 time slots.

In Example 15, the at least one machine-readable medium of any one of Examples 1 to 14 may optionally comprise wireless communication instructions that, in response to being executed on the computing device, cause the computing device to determine to send the join request based on a determination that a wireless network connection has been lost.

In Example 16, the at least one machine-readable medium of any one of Examples 1 to 15 may optionally comprise wireless communication instructions that, in response to being executed on the computing device, cause the computing device to send the join request to a wireless access point (AP).

In Example 17, the series of beacon intervals of any one of Examples 1 to 16 may optionally comprise defined beacon intervals (BIs) of an Institute of Electrical and Electronics Engineers (IEEE) 802.11 wireless network.

Example 18 is a wireless communication apparatus, comprising a processor circuit, a determination component for execution by the processor circuit to determine a current transmission interval comprising a series of beacon intervals, each of the series of beacon intervals comprising a plurality of time slots, randomly select one of the series of beacon intervals, and randomly select one of the plurality of time slots within the selected beacon interval, and a communications component for execution by the processor circuit to send a join request during the selected time slot.

In Example 19, the determination component of Example 18 may optionally be for execution by the processor circuit to determine whether the join request has been successful, and when it determines that the join request has not been successful, determine a subsequent transmission interval based on the current transmission interval and randomly select a time slot within a beacon interval of the subsequent transmission interval, the communications component for execution by the processor circuit to send a subsequent join request during the randomly selected time slot within the beacon interval of the subsequent transmission interval.

In Example 20, the determination component of Example 19 may optionally be for execution by the processor circuit to, when it determines that the join request has not been successful, determine whether the current transmission interval is less than a maximum transmission interval, determine the subsequent transmission interval by increasing the current transmission interval when the current transmission interval is less than the maximum transmission interval, and determine that the subsequent transmission interval is to be equal to the current transmission interval when the current transmission interval is not less than the maximum transmission interval.

In Example 21, the determination component of Example 20 may optionally be for execution by the processor circuit to determine the subsequent transmission interval by multiplying the current transmission interval by two when the current transmission interval is less than the maximum transmission interval.

In Example 22, the maximum transmission interval of Example 21 may optionally comprise 256 beacon intervals.

In Example 23, the determination component of any one of Examples 18 to 22 may optionally be for execution by the processor circuit to determine that the current transmission interval comprises an initial transmission interval when the join request comprises an initial join request.

In Example 24, the initial transmission interval of Example 23 may optionally comprise 8 beacon intervals.

In Example 25, the determination component of any one of Examples 18 to 24 may optionally be for execution by the processor circuit to determine the current transmission interval based on a previous transmission interval when it determines that a previous join request has not been successfully transmitted.

In Example 26, the join request of any one of Examples 18 to 25 may optionally comprise an authentication request frame.

In Example 27, the determination component of any one of Examples 18 to 26 may optionally be for execution by the processor circuit to determine whether the join request has been successfully transmitted based on whether an acknowledgment frame has been received in response to the join request.

In Example 28, the determination component of any one of Examples 18 to 27 may optionally be for execution by the processor circuit to randomly select the one of the series of beacon intervals by randomly selecting a beacon index based on the current transmission interval, and the beacon index may optionally identify the one of the series of beacon intervals.

In Example 29, the determination component of any one of Examples 18 to 28 may optionally be for execution by the processor circuit to randomly select the one of the plurality of time slots by randomly selecting a slot index identifying the one of the plurality of time slots.

In Example 30, each of the series of beacon intervals of any one of Examples 18 to 29 may optionally comprise a duration of 200 ms.

In Example 31, the plurality of time slots of any one of Examples 18 to 30 may optionally comprise 20 time slots.

In Example 32, the determination component of any one of Examples 18 to 31 may optionally be for execution by the processor circuit to determine to send the join request based on a determination that a wireless network connection has been lost.

In Example 33, the communications component of any one of Examples 18 to 32 may optionally be for execution by the processor circuit to send the join request to a wireless access point (AP).

In Example 34, the series of beacon intervals of any one of Examples 18 to 33 may optionally comprise defined beacon intervals (BIs) of an Institute of Electrical and Electronics Engineers (IEEE) 802.11 wireless network.

Example 35 is a system, comprising a wireless communication apparatus according to any one of Examples 18 to 34, a display, a radio frequency (RF) transceiver, and one or more RF antennas.

Example 36 is a wireless communication method, comprising determining, by a processor circuit, a current transmission interval comprising a series of beacon intervals, each of the series of beacon intervals comprising a plurality of time slots, randomly selecting one of the series of beacon intervals, randomly selecting one of the plurality of time slots within the selected beacon interval, and sending a join request during the selected time slot.

In Example 37, the wireless communication method of Example 36 may optionally comprise determining whether the join request has been successful, and when it is determined that the join request has not been successful, determining a subsequent transmission interval based on the current transmission interval, randomly selecting a time slot within a beacon interval of the subsequent transmission interval, and sending a subsequent join request during the randomly selected time slot within the beacon interval of the subsequent transmission interval.

In Example 38, the wireless communication method of Example 37 may optionally comprise, when it is determined that the join request has not been successful, determining whether the current transmission interval is less than a maximum transmission interval, when the current transmission interval is less than the maximum transmission interval, determining the subsequent transmission interval by increasing the current transmission interval, and when the current transmission interval is not less than the maximum transmission interval, determining that the subsequent transmission interval is to be equal to the current transmission interval.

In Example 39, the wireless communication method of Example 38 may optionally comprise, when the current transmission interval is less than the maximum transmission interval, determining the subsequent transmission interval by multiplying the current transmission interval by two.

In Example 40, the maximum transmission interval of Example 39 may optionally comprise 256 beacon intervals.

In Example 41, the wireless communication method of any one of Examples 36 to 40 may optionally comprise determining that the current transmission interval comprises an initial transmission interval when the join request comprises an initial join request.

In Example 42, the initial transmission interval of Example 41 may optionally comprise 8 beacon intervals.

In Example 43, the wireless communication method of any one of Examples 36 to 42 may optionally comprise determining the current transmission interval based on a previous transmission interval when it is determined that a previous join request has not been successfully transmitted.

In Example 44, the join request of any one of Examples 36 to 43 may optionally comprise an authentication request frame.

In Example 45, the wireless communication method of any one of Examples 36 to 44 may optionally comprise determining whether the join request has been successfully transmitted based on whether an acknowledgment frame has been received in response to the join request.

In Example 46, the randomly selecting the one of the series of beacon intervals of any one of Examples 36 to 45 may optionally comprise randomly selecting a beacon index based on the current transmission interval, and the beacon index may optionally identify the one of the series of beacon intervals.

In Example 47, the randomly selecting the one of the plurality of time slots of any one of Examples 36 to 46 may optionally comprise randomly selecting a slot index identifying the one of the plurality of time slots.

In Example 48, each of the series of beacon intervals of any one of Examples 36 to 47 may optionally comprise a duration of 200 ms.

In Example 49, the plurality of time slots of any one of Examples 36 to 48 may optionally comprise 20 time slots.

In Example 50, the wireless communication method of any one of Examples 36 to 49 may optionally comprise determining to send the join request based on a determination that a wireless network connection has been lost.

In Example 51, the wireless communication method of any one of Examples 36 to 50, may optionally comprise sending the join request to a wireless access point (AP).

In Example 52, the series of beacon intervals of any one of Examples 36 to 51 may optionally comprise defined beacon intervals (BIs) of an Institute of Electrical and Electronics Engineers (IEEE) 802.11 wireless network.

Example 53 is an apparatus, comprising means for performing a wireless communication method according to any one of Examples 36 to 52.

Example 54 is a system, comprising an apparatus according to Example 53, a display, a radio frequency (RF) transceiver, and one or more RF antennas.

Example 55 is at least one machine-readable medium comprising a plurality of instructions that, in response to being executed on a computing device, cause the computing device to perform a wireless communication method according to any one of Examples 36 to 52.

Example 56 is a communications device arranged to perform a wireless communication method according to any one of Examples 36 to 52.

Example 57 is a wireless communication apparatus, comprising means for determining a current transmission interval comprising a series of beacon intervals, each of the series of beacon intervals comprising a plurality of time slots, means for randomly selecting one of the series of beacon intervals, means for randomly selecting one of the plurality of time slots within the selected beacon interval, and means for sending a join request during the selected time slot.

In Example 58, the wireless communication apparatus of Example 57 may optionally comprise means for determining whether the join request has been successful, and means for, when it is determined that the join request has not been successful, determining a subsequent transmission interval based on the current transmission interval, randomly selecting a time slot within a beacon interval of the subsequent transmission interval, and sending a subsequent join request during the randomly selected time slot within the beacon interval of the subsequent transmission interval.

In Example 59, the wireless communication apparatus of Example 58 may optionally comprise means for, when it is determined that the join request has not been successful, determining whether the current transmission interval is less than a maximum transmission interval, when the current transmission interval is less than the maximum transmission interval, determining the subsequent transmission interval by increasing the current transmission interval, and when the current transmission interval is not less than the maximum transmission interval, determining that the subsequent transmission interval is to be equal to the current transmission interval.

In Example 60, the wireless communication apparatus of Example 59 may optionally comprise means for, when the current transmission interval is less than the maximum transmission interval, determining the subsequent transmission interval by multiplying the current transmission interval by two.

In Example 61, the maximum transmission interval of Example 60 may optionally comprise 256 beacon intervals.

In Example 62, the wireless communication apparatus of any one of Examples 57 to 61 may optionally comprise means for determining that the current transmission interval comprises an initial transmission interval when the join request comprises an initial join request.

In Example 63, the initial transmission interval of Example 62 may optionally comprise 8 beacon intervals.

In Example 64, the wireless communication apparatus of any one of Examples 57 to 63 may optionally comprise means for determining the current transmission interval based on a previous transmission interval when it is determined that a previous join request has not been successfully transmitted.

In Example 65, the join request of any one of Examples 57 to 64 may optionally comprise an authentication request frame.

In Example 66, the wireless communication apparatus of any one of Examples 57 to 65 may optionally comprise means for determining whether the join request has been successfully transmitted based on whether an acknowledgment frame has been received in response to the join request.

In Example 67, the randomly selecting the one of the series of beacon intervals of any one of Examples 57 to 66 may optionally comprise randomly selecting a beacon index based on the current transmission interval, and the beacon index may optionally identify the one of the series of beacon intervals.

In Example 68, the randomly selecting the one of the plurality of time slots of any one of Examples 57 to 67 may optionally comprise randomly selecting a slot index identifying the one of the plurality of time slots.

In Example 69, each of the series of beacon intervals of any one of Examples 57 to 68 may optionally comprise a duration of 200 ms.

In Example 70, the plurality of time slots of any one of Examples 57 to 69 may optionally comprise 20 time slots.

In Example 71, the wireless communication apparatus of any one of Examples 57 to 70 may optionally comprise means for determining to send the join request based on a determination that a wireless network connection has been lost.

In Example 72, the wireless communication apparatus of any one of Examples 57 to 71 may optionally comprise means for sending the join request to a wireless access point (AP).

In Example 73, the series of beacon intervals of any one of Examples 57 to 72 may optionally comprise defined beacon intervals (BIs) of an Institute of Electrical and Electronics Engineers (IEEE) 802.11 wireless network.

Example 74 is a system, comprising a wireless communication apparatus according to any one of Examples 57 to 73, a display, a radio frequency (RF) transceiver, and one or more RF antennas.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Furthermore, in the description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements.

In addition, the term "and/or" may mean "and," it may mean "or," it may mean "exclusive-or," it may mean "one," it may mean "some, but not all," it may mean "neither," and/or it may mean "both," although the scope of claimed subject matter is not limited in this respect. In the following description and/or claims, the terms "comprise" and "include," along with their derivatives, may be used and are intended as synonyms for each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the scope of the appended claims.

What is claimed is:

1. An apparatus comprising:
a memory; and
a processor configured to cause a wireless station to:
set a maximum transmission interval value;
initialize a transmission interval to a minimum transmission interval value;
select a first random number with an upper limit based on the transmission interval;
select a beacon interval based on the selected first random number;
select a second random number with an upper limit based on a number of slots in the beacon interval;
select a slot within the selected beacon interval based on the selected second random number;
trigger transmission of an authentication request frame within the selected slot of the selected beacon interval; and
increase the transmission interval based at least on an unsuccessful transmission of the authentication request frame.

2. The apparatus of claim 1, configured to cause the wireless station to:
selectively multiply the transmission interval by two to provide a second transmission interval with an upper bound of the maximum transmission interval value in response to an unsuccessful join request arising from the transmission of the authentication request frame;
select a second beacon interval by selection of a third random number bounded by the second transmission interval;
select a second slot within the selected second beacon interval by random number selection with an upper limit of a number of slots in the second beacon interval; and
trigger transmission of a second authentication request frame within the selected second slot.

3. The apparatus of claim 1, configured to cause the wireless station to:
increase the transmission interval in response to the transmission interval being less than the maximum transmission interval value and an unsuccessful join request arising from the transmission of the authentication request frame;
select a second beacon interval by selection of a third random number bounded by the increased transmission interval;
select a second slot within the second beacon interval by random number selection with an upper limit of a number of slots in the second beacon interval; and
trigger transmission of a second authentication request frame within the selected second slot.

4. The apparatus of claim 1, wherein the minimum transmission interval value is 8, and the maximum transmission interval value is 256.

5. The apparatus of claim 1 configured to cause the wireless station to:
determine a successful join request arising from the transmission of the authentication request frame based at least in part on receipt of an Acknowledge (ACK) message or no receipt of the ACK message.

6. The apparatus claim 1 comprising:
a physical layer logic;
a radio communicatively coupled to the physical layer logic; and
at least one antenna communicatively coupled to the radio.

7. The apparatus claim 6 comprising:
at least one processor to provide data for transmission;
at least one memory communicatively coupled to the at least one processor; and
a display communicatively coupled to the at least one processor.

8. The apparatus of claim 1, wherein the processor comprises a MAC sublayer processor.

9. At least one non-transitory computer-readable medium comprising instructions stored thereon, that when executed by one or more processors, cause the one or more processors to:
set a maximum transmission interval value;
initialize a transmission interval to a minimum transmission interval value;
select a first random number with an upper limit based on the transmission interval;
select a beacon interval based on the selected first random number;
select a second random number with an upper limit based on a number of slots in the beacon interval;
select a slot within the selected beacon interval based on the selected second random number;
trigger transmission of an authentication request frame within the selected slot of the selected beacon interval; and
increase the transmission interval based at least on an unsuccessful transmission of the authentication request frame.

10. The at least one non-transitory computer-readable medium of claim 9, wherein the instructions are to cause the one or more processors to:
selectively multiply the transmission interval by two to provide a second transmission interval with an upper bound of the maximum transmission interval value in response to an unsuccessful join request arising from the transmission of the authentication request frame;
select a second beacon interval by selection of a third random number bounded by the second transmission interval;
select a second slot within the selected second beacon interval by random number selection with an upper limit of a number of slots in the second beacon interval; and
trigger transmission of a second authentication request frame within the selected second slot.

11. The at least one non-transitory computer-readable medium of claim 9, wherein the instructions are to cause the one or more processors to:
increase the transmission interval in response to the transmission interval being less than the maximum transmission interval value and an unsuccessful join request arising from the transmission of the authentication request frame;
select a second beacon interval by selection of a third random number bounded by the increased transmission interval;
select a second slot within the second beacon interval by random number selection with an upper limit of a number of slots in the second beacon interval; and
trigger transmission of a second authentication request frame within the selected second slot.

12. The at least one non-transitory computer-readable medium of claim 9, wherein the minimum transmission interval value is 8, and the maximum transmission interval value is 256.

13. The at least one non-transitory computer-readable medium of claim 9, wherein the instructions are to cause the one or more processors to:
determine a successful join request arising from the transmission of the authentication request frame based at least in part on receipt of an Acknowledge (ACK) message or no receipt of the ACK message.

14. A method to be performed by a wireless station, the method comprising:
setting a maximum transmission interval value;
initializing a transmission interval to a minimum transmission interval value;
selecting a first random number with an upper limit based on the transmission interval;
selecting a beacon interval based on the selected first random number;
selecting a second random number with an upper limit based on a number of slots in the beacon interval;
selecting a slot within the selected beacon interval based on the selected second random number;

triggering transmission of an authentication request frame within the selected slot of the selected beacon interval; and increasing the transmission interval based at least on an unsuccessful transmission of the authentication request frame.

15. The method of claim 14 comprising:

selectively multiplying the transmission interval by two to provide a second transmission interval with an upper bound of the maximum transmission interval value in response to an unsuccessful join request arising from the transmission of the authentication request frame;

selecting a second beacon interval by selection of a third random number bounded by the second transmission interval;

selecting a second slot within the selected second beacon interval by random number selection with an upper limit of a number of slots in the second beacon interval; and triggering transmission of a second authentication request frame within the selected second slot.

16. The method of claim 14 comprising:

increasing the transmission interval in response to the transmission interval being less than the maximum transmission interval value and an unsuccessful join request arising from the transmission of the authentication request frame;

selecting a second beacon interval by selection of a third random number bounded by the increased transmission interval;

selecting a second slot within the second beacon interval by random number selection with an upper limit of a number of slots in the second beacon interval; and triggering transmission of a second authentication request frame within the selected second slot.

17. The method of claim 14, wherein the minimum transmission interval value is 8, and the maximum transmission interval value is 256.

18. The method of claim 14 comprising:

determining a successful join request arising from the transmission of the authentication request frame based at least in part on receipt of an Acknowledge (ACK) message or no receipt of the ACK message.

19. An apparatus comprising:

a memory; and a processor configured to cause an Access Point (AP) to:

access an authentication request frame received within a slot of a beacon interval, the slot is based on a first random number bounded by an upper limit of a number of slots in the beacon interval, the beacon interval is based on a second random number bounded by an upper limit of a transmission interval;

trigger transmission of an acknowledgement to a wireless station (STA) to indicate receipt of the authentication request frame in response to receipt of the authentication request frame;

access another authentication request frame from another wireless station; and trigger transmission of another acknowledgement to the another wireless station.

20. The apparatus of claim 19, wherein the processor comprises a MAC sublayer processor.

21. The apparatus of claim 19, wherein a value of the upper limit of the transmission interval is 256.

22. The apparatus claim 19 comprising:

a physical layer logic;

a radio communicatively coupled to the physical layer logic; and at least one antenna communicatively coupled to the radio.

23. At least one non-transitory computer-readable medium comprising instructions stored thereon, that when executed by one or more processors, cause the one or more processors to:

access an authentication request frame received within a slot of a beacon interval, the slot is based on a first random number bounded by an upper limit of a number of slots in the beacon interval, the beacon interval is based on a second random number bounded by an upper limit of a transmission interval;

trigger transmission of an acknowledgement to a wireless station (STA) to indicate receipt of the authentication request frame in response to receipt of the authentication request frame;

access another authentication request frame from another wireless station; and trigger transmission of another acknowledgement to the another wireless station.

24. The least one non-transitory computer-readable medium of claim 23, wherein a value of the upper limit of the transmission interval is 256.

* * * * *